United States Patent
Di Pietro et al.

(10) Patent No.: US 9,705,914 B2
(45) Date of Patent: Jul. 11, 2017

(54) SIGNATURE CREATION FOR UNKNOWN ATTACKS

(71) Applicant: Cisco Technology, Inc., San Jose, CA (US)

(72) Inventors: Andrea Di Pietro, Lausanne (CH); Jean-Philippe Vasseur, Saint Martin d'Uriage (FR); Javier Cruz Mota, Assens (CH)

(73) Assignee: Cisco Technology, Inc., San Jose, CA (US)

( * ) Notice: Subject to any disclaimer, the term of this patent is extended or adjusted under 35 U.S.C. 154(b) by 28 days.

(21) Appl. No.: 14/338,719

(22) Filed: Jul. 23, 2014

(65) Prior Publication Data

US 2016/0028750 A1    Jan. 28, 2016

(51) Int. Cl.
*H04L 29/06* (2006.01)
*G06F 21/53* (2013.01)
(Continued)

(52) U.S. Cl.
CPC ...... *H04L 63/1458* (2013.01); *H04L 63/1425* (2013.01); *G06F 21/53* (2013.01); *G06F 21/55* (2013.01); *G06F 21/56* (2013.01); *G06F 21/566* (2013.01); *H04L 63/1408* (2013.01); *H04L 63/1416* (2013.01); *H04L 63/1441* (2013.01)

(58) Field of Classification Search
CPC . H04L 63/12; H04L 63/1416; H04L 63/1458; H04L 63/1441; H04L 63/14; H04L 45/08; H04L 63/1425; H04L 63/1408; G06N 99/005; G06N 3/02; G06F 19/707; G06F 19/24; G06F 15/18; G06F 21/566; G06F 21/53; G06F 21/56; G06F 21/55
See application file for complete search history.

(56) References Cited

U.S. PATENT DOCUMENTS

| | | | |
|---|---|---|---|
| 7,225,343 B1 * | 5/2007 | Honig | G06F 21/554 713/189 |
| 7,941,382 B2 | 5/2011 | Stokes et al. | |

(Continued)

OTHER PUBLICATIONS

Nagpal, P., "Machine learning sets new standard in network-based application whitelisting", http://www.networkworld.com/article/2169328/tech-primers/machine-learning-sets-new-standard-in-network-based-application-whitelisting.html, Aug. 23, 2013, 3 pages. Network World, Inc.

*Primary Examiner* — Morshed Mehedi
*Assistant Examiner* — Ayoub Alata
(74) *Attorney, Agent, or Firm* — Parker Ibrahim & Berg LLC; James M. Behmke; Stephen D. LeBarron

(57) ABSTRACT

In one embodiment, a device in a network generates an expected traffic model based on a training set of data used to train a machine learning attack detector. The device provides the expected traffic model to one or more nodes in the network. The device receives an unexpected behavior notification from a particular node of the one or more nodes. The particular node generates the unexpected behavior notification based on a comparison between the expected traffic model and an observed traffic behavior by the node. The particular node also prevents the machine learning attack detector from analyzing the observed traffic behavior. The device updates the machine learning attack detector to account for the observed traffic behavior.

26 Claims, 13 Drawing Sheets

(51) Int. Cl.
    *G06F 21/56*        (2013.01)
    *G06F 21/55*        (2013.01)

(56)            References Cited

U.S. PATENT DOCUMENTS 8,352,409 B1 *  1/2013   Satish ................. G06N 99/005
                                                           706/52
    8,379,085 B2    2/2013   Cobb et al.
    8,516,584 B2    8/2013   Moskovitch et al.
    2004/0059947 A1 3/2004   Lee
    2007/0067839 A1* 3/2007  Hamada .............. H04L 41/5009
                                                           726/22
    2008/0083029 A1 4/2008   Yeh et al.
    2008/0184371 A1* 7/2008  Moskovitch .......... G06F 21/566
                                                           726/24
    2011/0185422 A1* 7/2011  Khayam ............ H04L 63/1425
                                                           726/23
    2013/0039183 A1* 2/2013  Nooren ............... H04L 41/5019
                                                           370/235

* cited by examiner

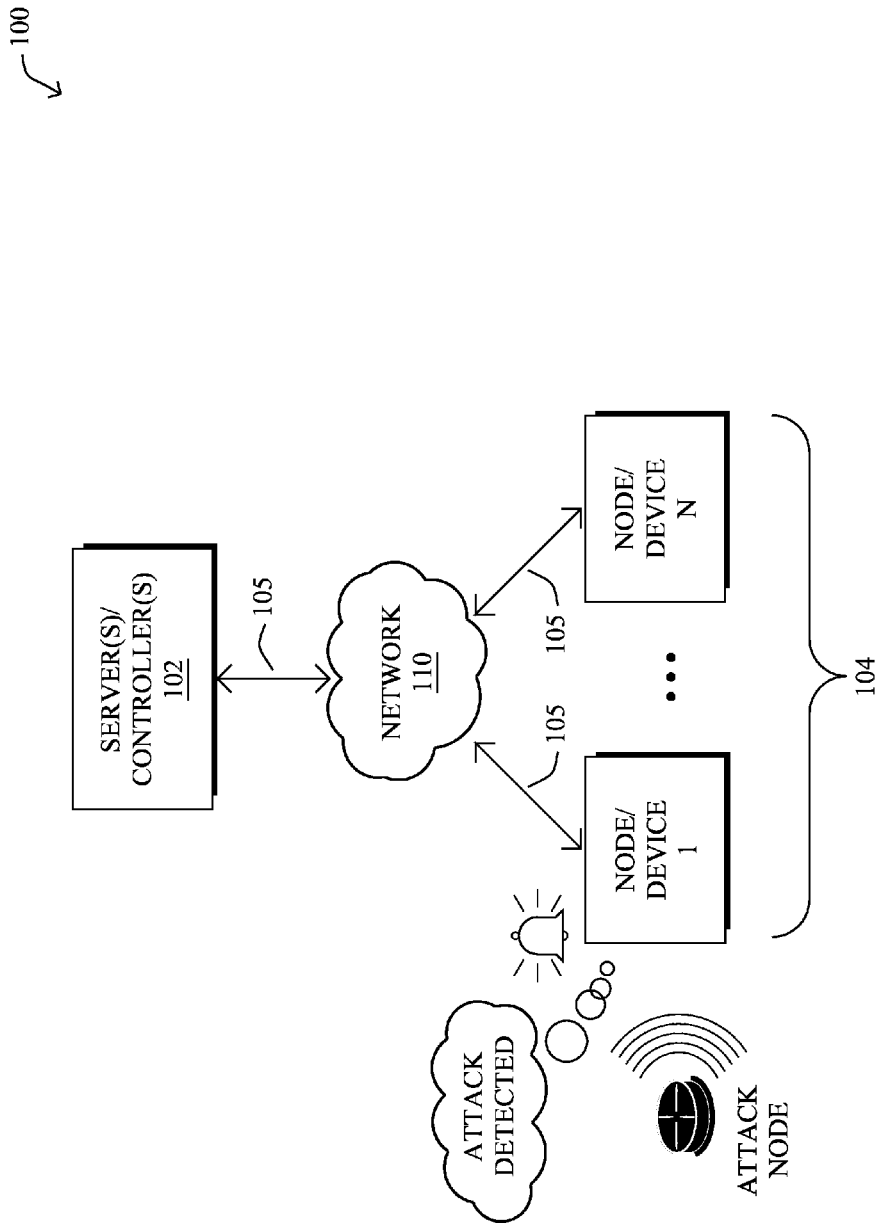

SIGNATURE CREATION FOR UNKNOWN ATTACKS

TECHNICAL FIELD

The present disclosure relates generally to computer networks, and, more particularly, to creating signatures for unknown network attacks.

BACKGROUND

Enterprise networks are carrying a very fast growing volume of both business and non-business critical traffics. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

One type of network attack that is of particular concern in the context of a computer network is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. The detection of DoS attacks is particularly challenging when network resources are limited, such as in the case of a low power and lossy network (LLN).

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 3A-3B illustrate an example of a network attack being detected;

DESCRIPTION OF EXAMPLE EMBODIMENTS

Overview

Figure 1:
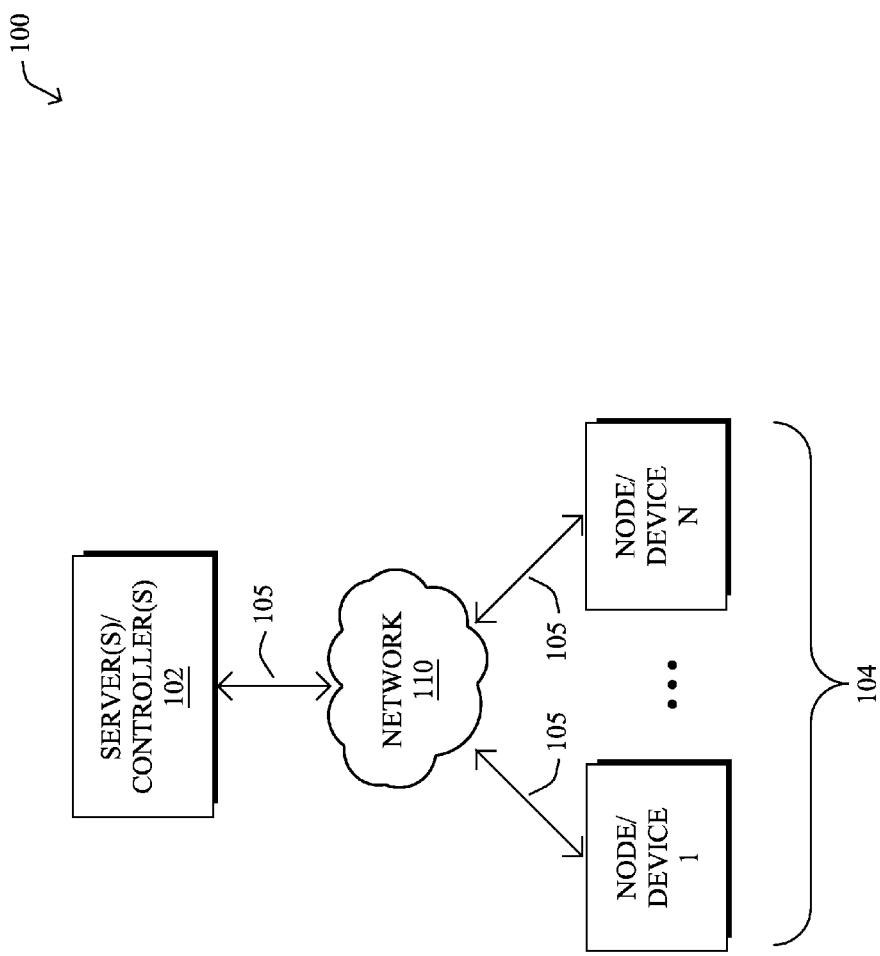
FIG. 1 illustrates an example communication network.

According to one or more embodiments of the disclosure, a device in a network generates an expected traffic model based on a training set of data used to train a machine learning attack detector. The device provides the expected traffic model to one or more nodes in the network. The device receives an unexpected behavior notification from a particular node of the one or more nodes. The particular node generates the unexpected behavior notification based on a comparison between the expected traffic model and an observed traffic behavior by the node. The particular node also prevents the machine learning attack detector from analyzing the observed traffic behavior. The device updates the machine learning attack detector to account for the observed traffic behavior.

In further embodiments, a node in a network receives an expected traffic model that is based on a training set of data used to train a machine learning attack detector executed by the node. The node observes a traffic behavior of traffic through the network. The node also determines that the observed traffic behavior is an unexpected traffic behavior by comparing the observed traffic behavior to the expected traffic model. The node prevents the machine learning attack detector from analyzing the unexpected traffic behavior. The node sends an unexpected behavior notification that identifies the unexpected traffic behavior.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer system 100 illustratively comprising one or more server(s)/controller(s) 102 and one or more nodes/devices 104 (e.g., a first through nth node/device) that are interconnected by various methods of communication. For example, links 105 may be wired links or shared media (e.g., wireless links, PLC links, etc.) that illustratively form a network 110. Those skilled in the art will understand that any number of nodes, devices, links, etc. may be used in computer system 100, and that the view shown herein is for simplicity. Also, those skilled in the art will further understand that while the network is shown in a certain orientation, system 100 is merely an example illustration that is not meant to limit the disclosure.

In general, server(s)/controller(s) 102 provide some form of control over nodes/devices 104 and, more generally, over the operation of network 110. For example, servers/controllers 102 may include, but are not limited to, path computation engines (PCEs), network controllers, network management systems (NMSs), policy engines, reporting mechanisms, or any other form of device or system that provides some degree of global or localized control over other devices in network 110.

Nodes/devices 104 may include any form of networking device used to generate, forward, receive, etc., traffic within network 110. For example, nodes/device 104 may include, but are not limited to, routers, switches, computers, or the like.

Data packets (e.g., traffic and/or messages sent between the devices/nodes) may be exchanged among the nodes/devices of the computer system 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

In some embodiments, network 110 may be or may include a WAN, LAN, service provider network, customer edge network, multi-protocol label switched (MPLS) network, IP network, wireless network, mesh network, shared media network, virtual private network (VPN), or any other form of computing network. In one embodiment, network 110 may be, or may include, a Low Power and Lossy Network (LLN). LLNs (e.g., certain sensor networks), may be used in a myriad of applications, such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnections are constrained: LLN routers typically operate with constraints, e.g., processing power, memory, and/or energy (battery), and their interconnections are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

Figure 2:
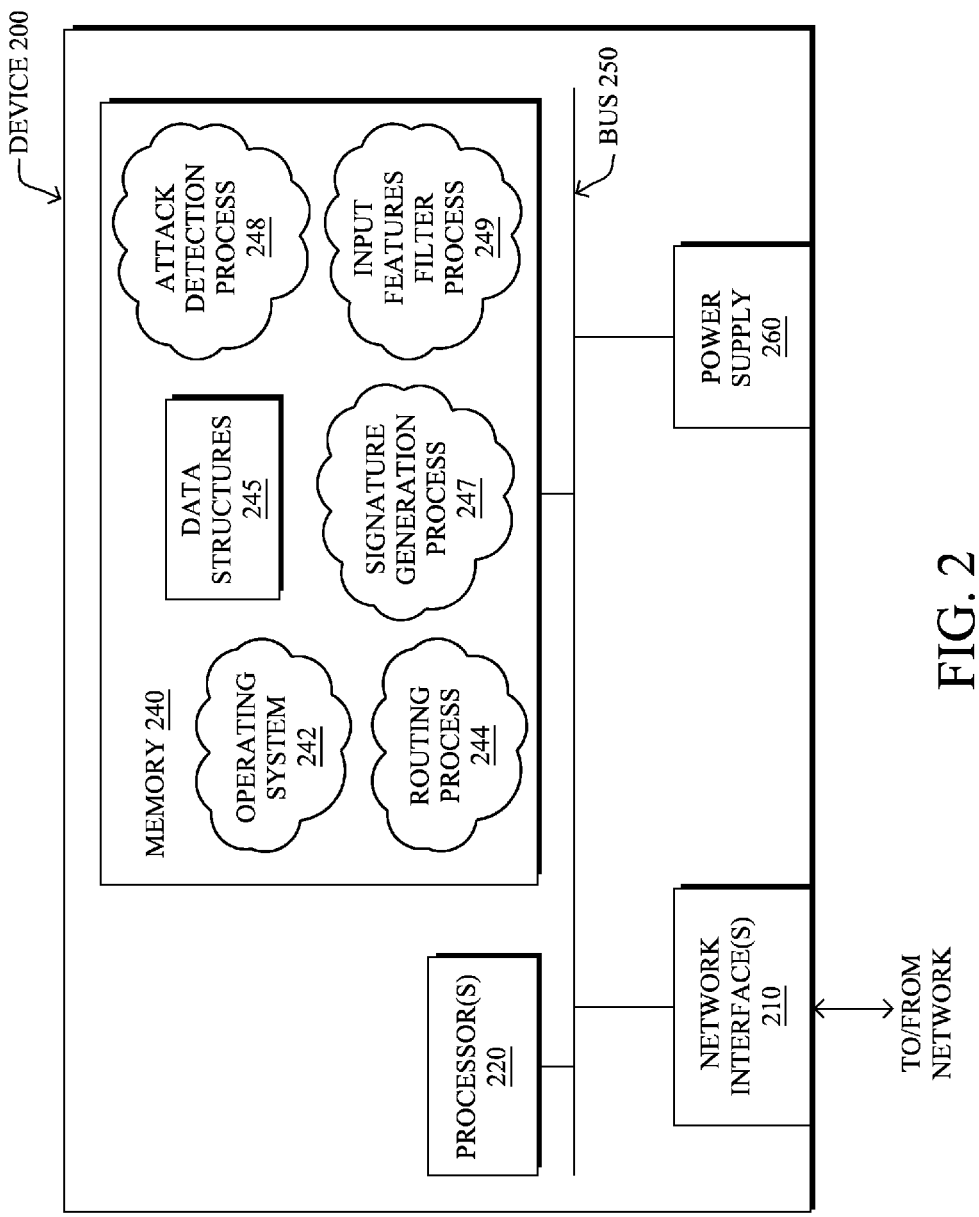
FIG. 2 illustrates an example network device/node.

FIG. 2 is a schematic block diagram of an example node/device 200 that may be used with one or more embodiments described herein, e.g., as any of the devices shown in FIG. 1 (e.g., a server/controller 102, a node/device 104, etc.). The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 110. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, a signature generation process 247, an attack detection process 248, and/or an input features filter process 249, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Attack detection process 248 includes computer executable instructions executed by the processor 220 to perform various functions, such as attack detection and reporting. In various embodiments, attack detection process 248 may use machine learning to detect an attack. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes such that M=a*x+b*y+c and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data. Accordingly, attack detection process 248 may be an attack detection classifier that classifies network traffic or conditions into either an "attack" category or a "normal operation" category, based on learned behavior of the network. Further categories that represent specific types of attacks may also be used (e.g., a "UDP flooding attack" label, etc.). Said differently, attack detection process 248 may be configured to assign one of a set of output labels (e.g., "normal," "attack," etc.) to an input set of network observations or metrics. In various cases, an applied label may also have an associated probability determined by the learning machine (e.g., a confidence score associated with an applied label, etc.).

As also noted above, learning machines (LMs) are computational entities that rely on one or more machine learning processes for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator.

Artificial Neural Networks (ANNs) are a type of machine learning technique whose underlying mathematical models were developed inspired by the hypothesis that mental activity consists primarily of electrochemical activity between interconnected neurons. ANNs are sets of computational units (neurons) connected by directed weighted links. By combining the operations performed by neurons and the weights applied by the links, ANNs are able to perform highly non-linear operations to input data. The interesting aspect of ANNs, though, is not that they can produce highly non-linear outputs of the input, but that they can learn to reproduce a predefined behavior through a training process. Accordingly, an ANN may be trained to identify deviations in the behavior of a network that could indicate the presence of a network attack (e.g., a change in packet losses, link delays, number of requests, etc.). In some cases, ANN classifiers may be hierarchical in that a more powerful classifier verifies a conclusion reached by a lower-powered classifier. Other machine learning techniques that may be used in an attack detection classifier may include, but are not limited to, support vector machines (SVMs), naïve Bayesian models, decision trees, and the like.

Attack detection process 248 may also employ anomaly detection techniques, to classify network conditions as being indicative of an attack. Anomaly Detection (AD) is a data mining and machine learning technique that entails detecting, from a flow of data, the elements of the flow that do not follow the same pattern as the other flow elements. In particular, AD techniques may be used to construct a model of normal behavior and may use the model to detect data points that are unlikely to fit the model. Example AD techniques include, but are not limited to, k-NN techniques, one-class SVM techniques, replicator NN techniques, etc. Notably, such techniques may be used by learning machine process 248 to detect previously unseen forms of attacks.

In further embodiments, attack detection process 248 may use clustering techniques, to detect a potential network attack. Clustering denotes a family of techniques in which the objective is to group objects according to some (usually predefined) notion of similarity. For instance, clustering is a very popular technique used in recommender systems (RS) for grouping objects that are similar in terms of people's tastes. This way, the system can propose new products that the user will like with a high probability, based on previous choices of this particular user. Typical clustering algorithms are k-means, DBSCAN or Mean-Shift, among others.

Signature generation process 247, as described in greater detail below, includes computer executable instructions executed by the processor 220 to perform functions regarding the generation and use of an expected traffic model. Such a model may be based on, for example, the set of training data used to train attack detection process 248.

Input features filter process 249, also as described in greater detail below, includes computer executable instructions executed by the processor 220. In general, input features filter process 249 may operate in conjunction with the expected traffic model generated by signature generation process 247, to determine whether an observed network/traffic behavior is unexpected (e.g., the behavior was not present in the training set of data used to train attack detection process 248).

Figure 3B:
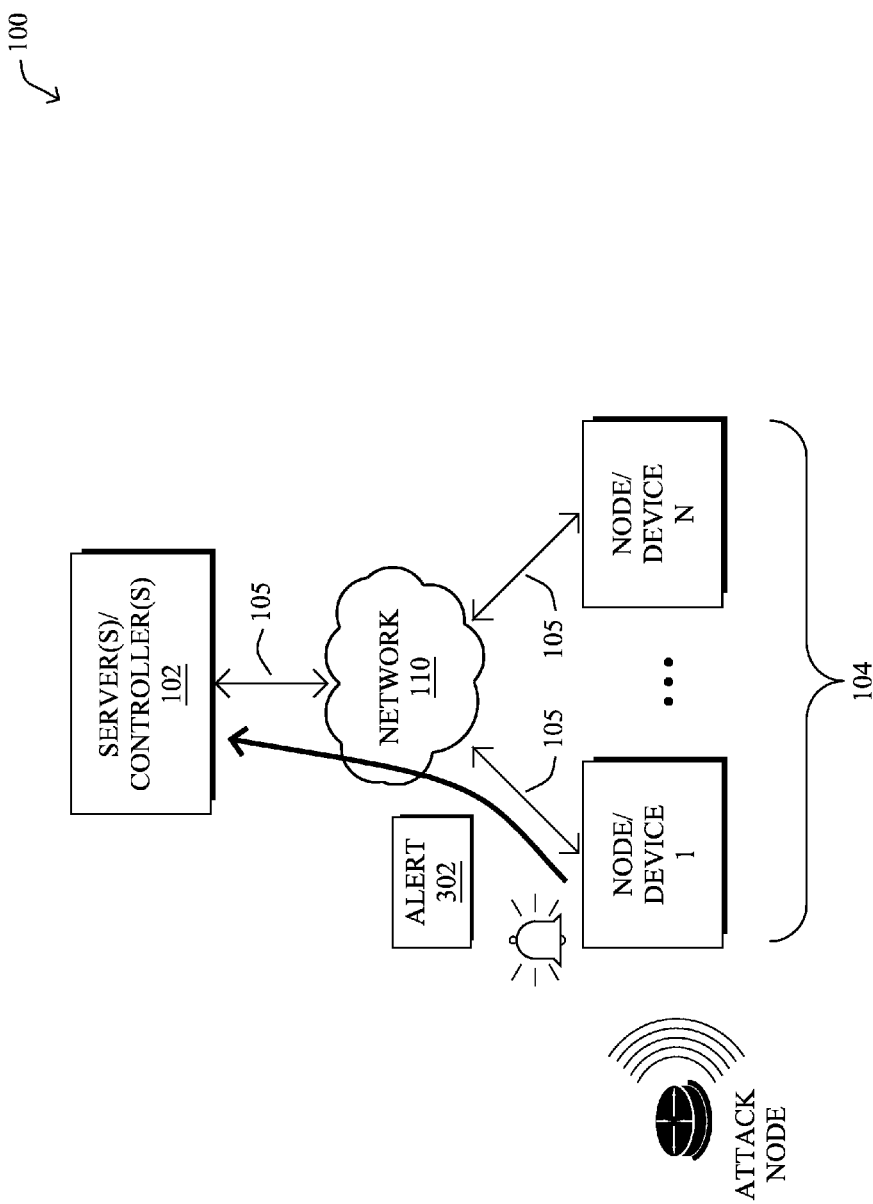

FIGS. 3A-3B illustrate an example of a network attack being detected, according to various embodiments. As shown, assume that a particular node/device 104 is under attack from an attack node. During a DoS attack, for example, the attack node may attempt to flood the node/device with request traffic (e.g., SYN flooding), thereby reducing the amount of resources available at the device/node (and potentially the network itself) for legitimate traffic. Notably, other forms of DoS attacks may attempt to send a high volume of traffic (e.g., a volume based DoS attack) and may, in some cases, be distributed DoS (DDoS) attacks.

As shown in FIG. 3A, assume that the particular node/device 104 under attack is configured to execute an attack detector process (e.g., process 248). In general, the attack detector process may be operable to observe traffic behavior and apply a label (e.g., a classification) to the observed traffic behavior. For example, the node/device 104 under attack may determine that a sharp increase in request traffic is indicative of an attack (e.g., the observed behavior may be labeled as an attack by the device's machine learning process). In such a case, as shown in FIG. 3B, the node/device 104 may initiate countermeasures, such as sending an alert 302 to one of the servers/controller 102 (e.g., to alert a network administrator), etc.

As noted above, ANN based classification provides an excellent mean of detecting well-known attacks and discriminating attack-related traffic from normal traffic. In particular, once the attack behavior is described in a well labelled dataset, the ANN is able to correctly recognize it. However, one of the drawbacks of such model is that its output behavior may be unpredictable if the submitted input is too far away from any samples in the training set. In other words, the performance of an ANN classifier (and, in general, of any ML-based classifier) is undetermined when the input features are not well represented in the subspace generated by the samples in the training set.

Thus, while an ANN is typically very good at recognizing known attacks, it may miss unknown attacks that it has not been trained to detect or, alternatively, label an unknown attack as a different known attack. Both behaviors may impinge network performance. In particular, failing to identify the attack at all may expose the network to the threat. Conversely, misclassifying an attack may trigger an in appropriate mitigation strategy.

Signature Creation for Unknown Attacks

The techniques herein allow identification of unrecognized behaviors that were not described and/or known in the training data set used to train a machine learning classifier (e.g., an ANN, etc.). In some aspects a machine learning model describing the overall set of behaviors for which an attack detection classifier has been trained may be generated and used to ensure that any observed behavior in the network is expected by the attack detector. If the model detects that an unexpected behavior is being observed, the associated data may be redirected to a central entity which recomputes the classifier by accounting for the new observed behavior. In some aspects, the update to the classifier may leverage the recommendation of an external expert, such as a network administrator, etc. On one hand, the techniques herein may improve the reliability of a learning machine-based attack detection mechanism, such as when an ANN is used. On the other hand, the techniques may also allow the automatic generation of signatures for unknown attacks, thereby allowing the attack detection mechanism to adapt to previously unknown situations.

Specifically, according to one or more embodiments of the disclosure as described in detail below, a device in a network generates an expected traffic model based on a training set of data used to train a machine learning attack detector. The device provides the expected traffic model to one or more nodes in the network. The device receives an unexpected behavior notification from a particular node of the one or more nodes. The particular node generates the unexpected behavior notification based on a comparison between the expected traffic model and an observed traffic behavior by the node. The particular node also prevents the machine learning attack detector from analyzing the observed traffic behavior. The device updates the machine learning attack detector to account for the observed traffic behavior.

Illustratively, the techniques described herein may be performed by hardware, software, and/or firmware, such as in accordance with the processes 244 and 247-249, which may include computer executable instructions executed by the processor 220 (or independent processor of interfaces 210) to perform functions relating to the techniques described herein. For example, the techniques herein may be treated as extensions to conventional protocols, such as the various PLC protocols or wireless communication protocols, and as such, may be processed by similar components understood in the art that execute those protocols, accordingly.

Figure 4A:
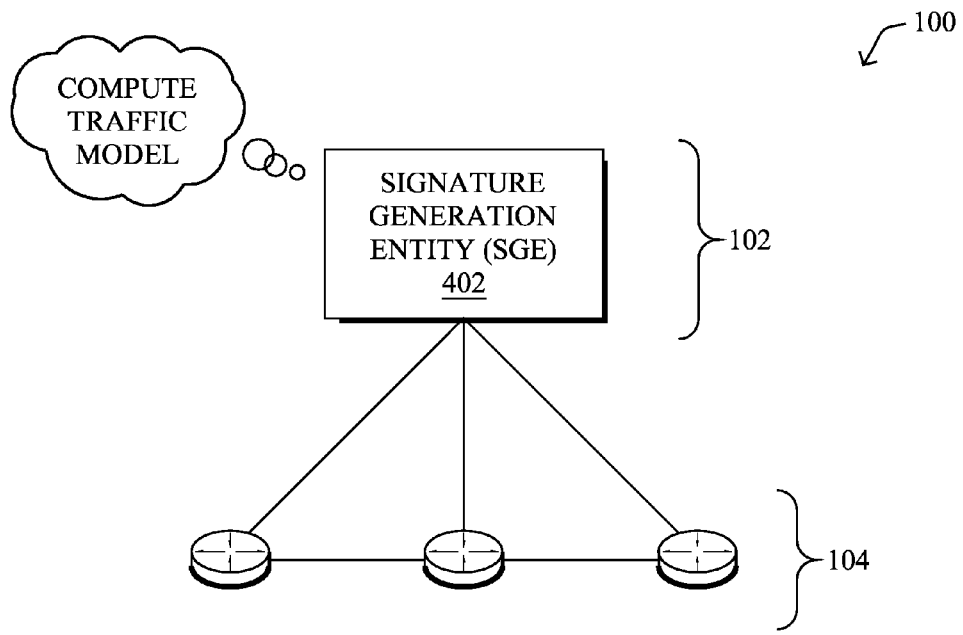
FIGS. 4A-4C illustrate an example of an expected traffic model being deployed.

Operationally, the techniques herein provide for a device in the network (e.g., a server, controller, node, etc.) to operate as a signature generation entity (SGE) (e.g., by executing signature generation process 247). In general, the SGE may be responsible for the computation of a learning machine-based attack detector using any or all of the known traffic behaviors. In one embodiment, the SGE may be the same device (e.g., the signature process may be co-located on the device) that computes/trains the attack detector. Typically this is a reasonable choice, since such a device may already be equipped with non-negligible computational power and already hosts the training data set locally. For example, as shown in FIG. 4A, assume that one of servers/controller 102 operates as an SGE 402. In such a case, SGE 402 may use a set of training data to train an attack detector (e.g., attack detection process 248) and distribute the attack detector to one or more of the devices/nodes 104.

Also as shown in FIG. 4A, SGE 402 may compute an expected traffic model using some or all of the training data that is used to train the machine learning attack detector process. Any number of different techniques may be used to generate the expected traffic model. For example, a Gaussian Mixture Model (GMM) or cluster-based model may be used for the expected traffic model. Regardless of the type of model used, the model may be generated to fit over the entire training dataset, which potentially includes samples of normal traffic in addition to samples of the well-known attacks.

Figure 4B:
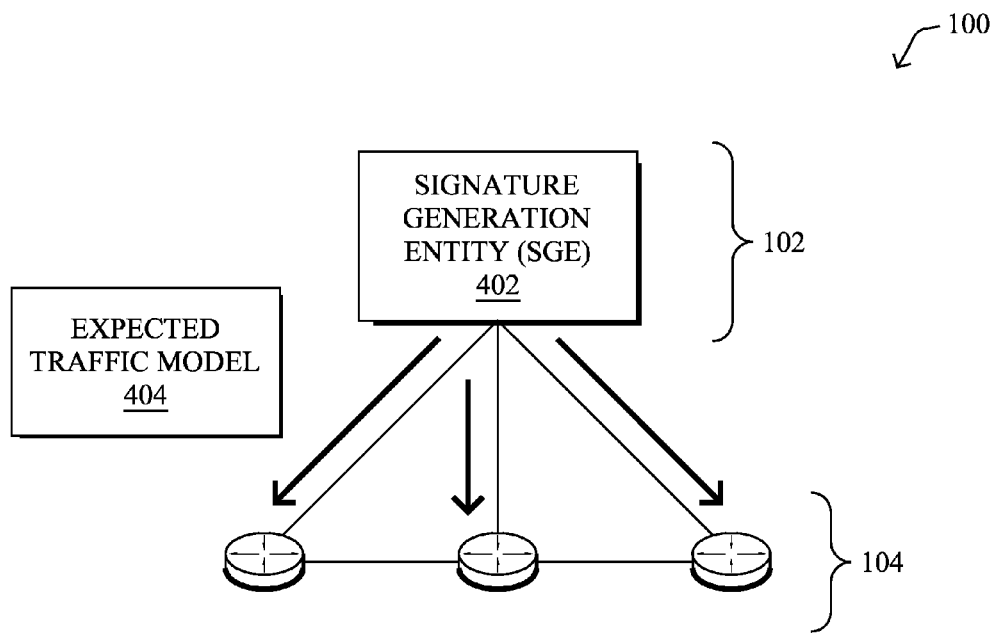

Once the expected traffic model has been computed by the SGE, it may be encoded as a custom message referred to as an expected traffic model and sent to any or of the devices/nodes to which the corresponding attack detector is deployed. For example, as shown in FIG. 4B, SGE 402 may send expected traffic model message 404 to the various nodes/devices 104 which have the corresponding attack detector installed. Message 404 may include any or all of the following:

A model identifier—In some cases, message 404 may include an identifier for the type of model used (e.g., a GMM, a cluster-based model, etc.).

A model description—In one embodiment, message 404 may also include a description of the model, such as the parameters of the Gaussian distribution in a GMM, the cluster centers in a cluster-based model, etc.

An anomaly score threshold—In some embodiments, message 404 may include an anomaly score threshold that may be used by a device/node to denote how far an observed behavior may stray from the expected traffic model before being labeled as unexpected. In particular, each model can provide an anomaly score threshold for an observed feature vector that defines how far a vector can be with respect to the modeled behavior that was used to train the ANN before being considered anomalous. The particular nature of such a score depends on the model. For example, in case of a statistical model, the anomaly score may be the inverse of the vector likelihood with respect to the model itself. In another example, if the model is a cluster-based model, the anomaly score may represent the distance of the vector from its closest cluster center (centroid). The included threshold may be used in order to flag a feature vector as 'normal' or 'anomalous'.

Figure 4C:
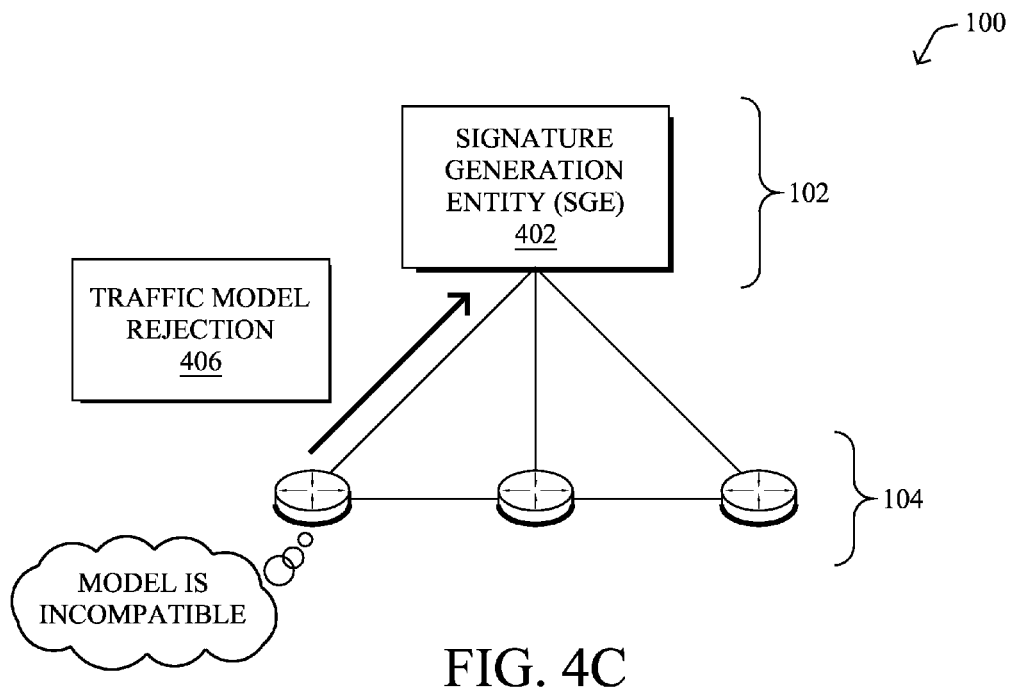

In some cases, an expected traffic model may also be associated with a particular version of the attack classifier configuration. In particular, the model may describe the training data set which was used to train the attack detection classifier. Thus, nodes which are running an incompatible version of the attack detector may not be able to use the received expected traffic model. Such a node may, in some cases, respond with an expected traffic model reject message and ignore the received information. For example, as shown in FIG. 4C, a particular node may determine that the expected traffic model received from SGE 402 is incompatible with its installed attack detector and respond with a traffic model rejection message 406. In one embodiment, SGE 402 may respond to message 406 by sending a description of the attack detector associated with the expected traffic model, so that the rejecting node can update its own attack detector.

In another embodiment, the expected traffic model message may be sent to a network controller using a custom IP message. In turn, the network control may decide to multicast the message to other entities hosting ANN-based classifiers in the network after applying a specific policy. For example, such a policy may be used to control the frequency of such messages, the set of ANN-based classifiers that should be updated, etc.

Figure 5A:
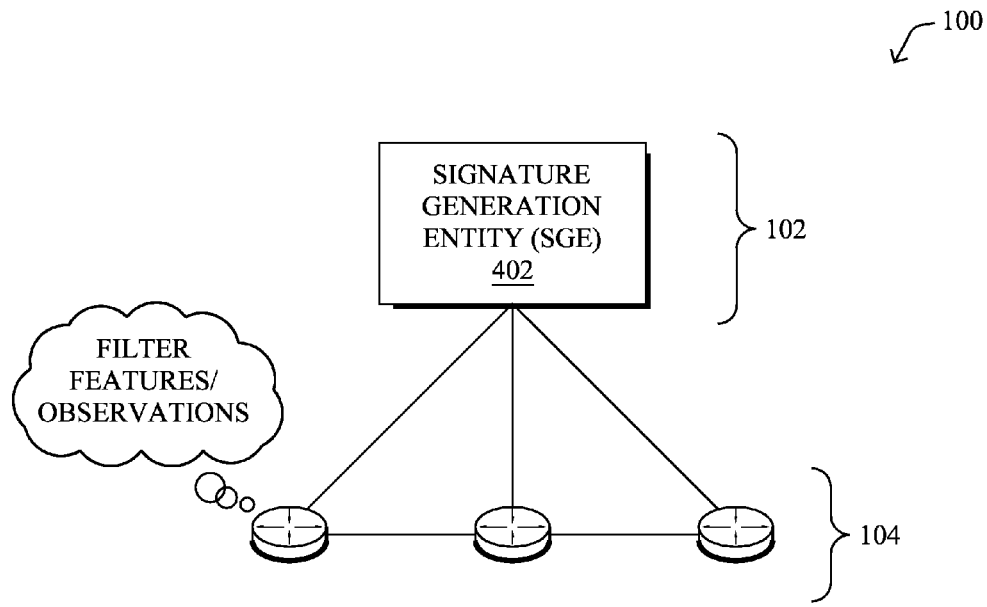
FIGS. 5A-5C illustrate an example of an unexpected traffic behavior being detected.
Figure 5B:
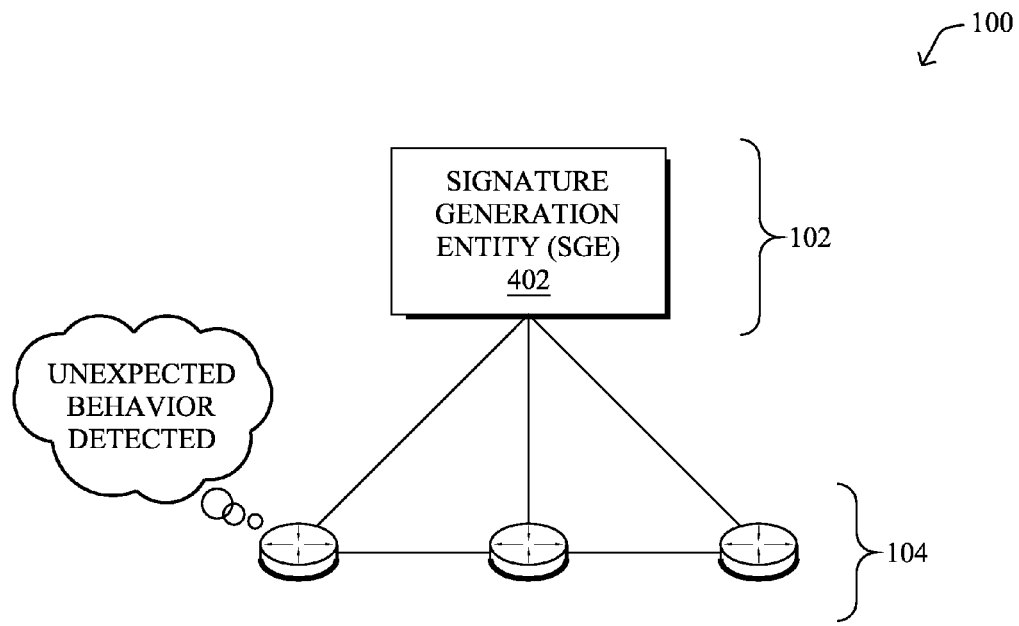

In some embodiments, a node executing an installed attack detector (e.g., an ANN-based classifier, etc.) may also execute an input features filter (e.g., input features filter process 249). When executed, this process is operable to check the incoming traffic features against the expected traffic model that was computed by the SGE. In particular, input features filter may check whether the behavior which is being observed by the node falls within the range of behaviors that the attack detector was trained to recognize. Notably, in some cases, the input features filter may not make any decisions as to whether an attack is being observed, but may simply check the observed data against the installed expected traffic model. If the incoming features vector is scored as 'expected' by the expected traffic model, the filter may forward the feature vector to the classifier (e.g., attack detection process 248) for classification (e.g., detection of the attack). In greater detail, the filter may compute an anomaly score for the input vector with respect of the expected traffic model and compare the computed score against the threshold included in the expected traffic model message (e.g., message 404). If the computed anomaly score is lower than the threshold, the feature vector may be forwarded to the ANN for classification. Otherwise, evaluation by the attack detector may be suspended, to prevent a potentially unpredictable result from occurring. For example, as shown in FIGS. 5A-5B, a particular node 104 may filter its input features/observations, detect an unexpected behavior by comparing this observed behavior to its installed expected traffic model, compute an anomaly score based on the comparison, and determine that the anomaly score meets or exceeds an anomaly score threshold.

Figure 5C:
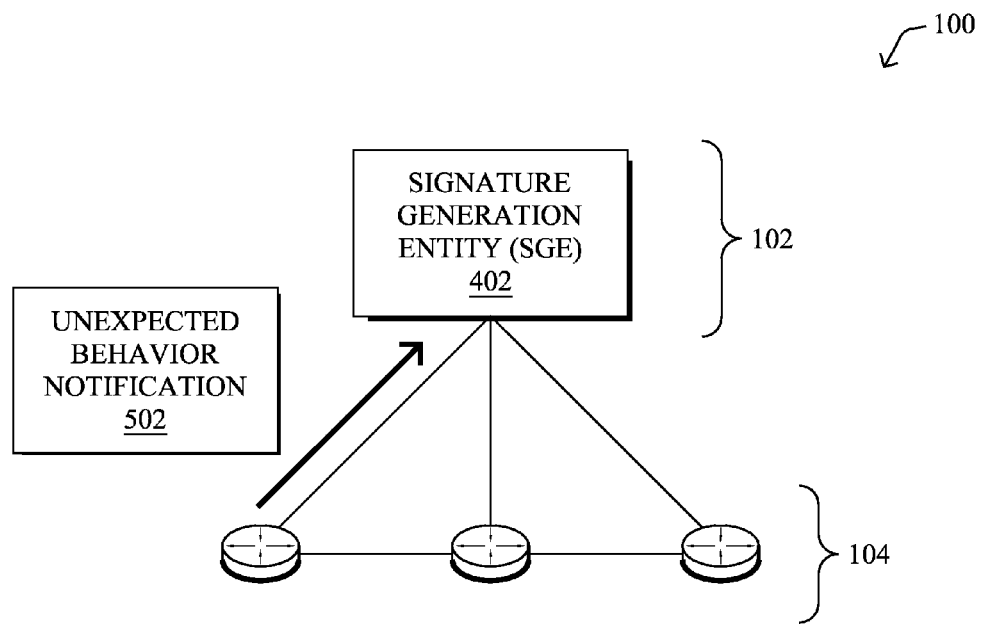

If unexpected traffic behavior is detected by a node/device, the input features filter may redirect the feature vectors with anomaly scores greater than the anomaly score threshold to the SGE. For example, as shown in FIG. 5C, a node that detects an unexpected behavior may send a custom unexpected behavior notification 502 to SGE 402. In some embodiments, the number of notifications 502 that are sent by the nodes/devices 104 may be controlled by one or more parameters. For example, a notification threshold may be set that is equal to or greater than the anomaly score threshold, to control whether or not a notification 502 is sent to SGE 402. In another example, notification 502 may only be sent to SGE 402 if an unexpected behavior is observed a certain number of times within a specified time period (e.g., the unexpected behavior is consistently observed).

Figure 6A:
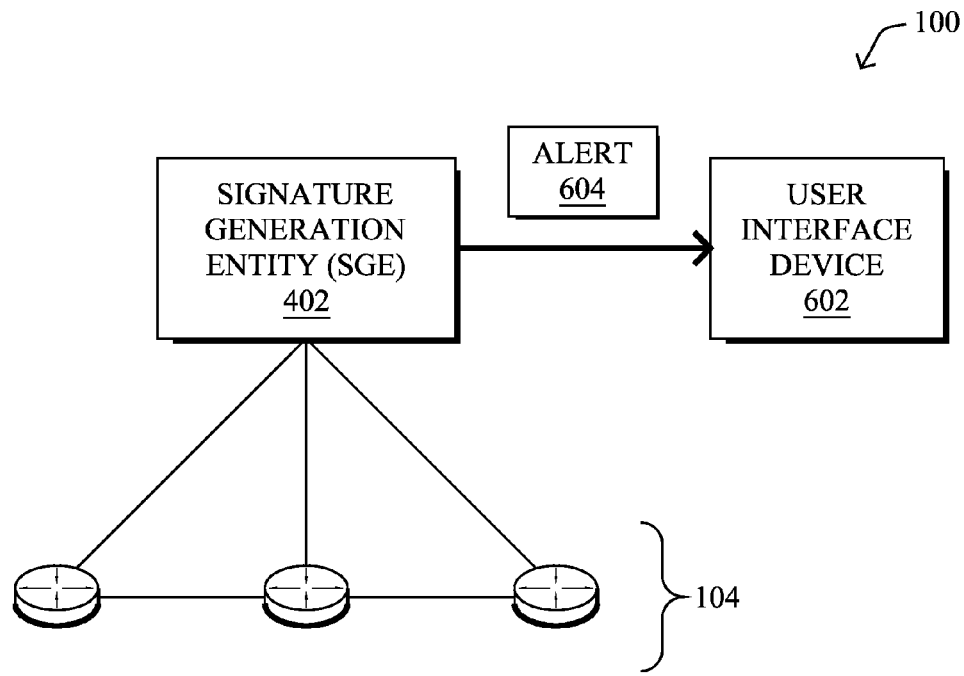
FIGS. 6A-6C illustrate an example of an attack detector being updated via a user interface device.
Figure 6B:
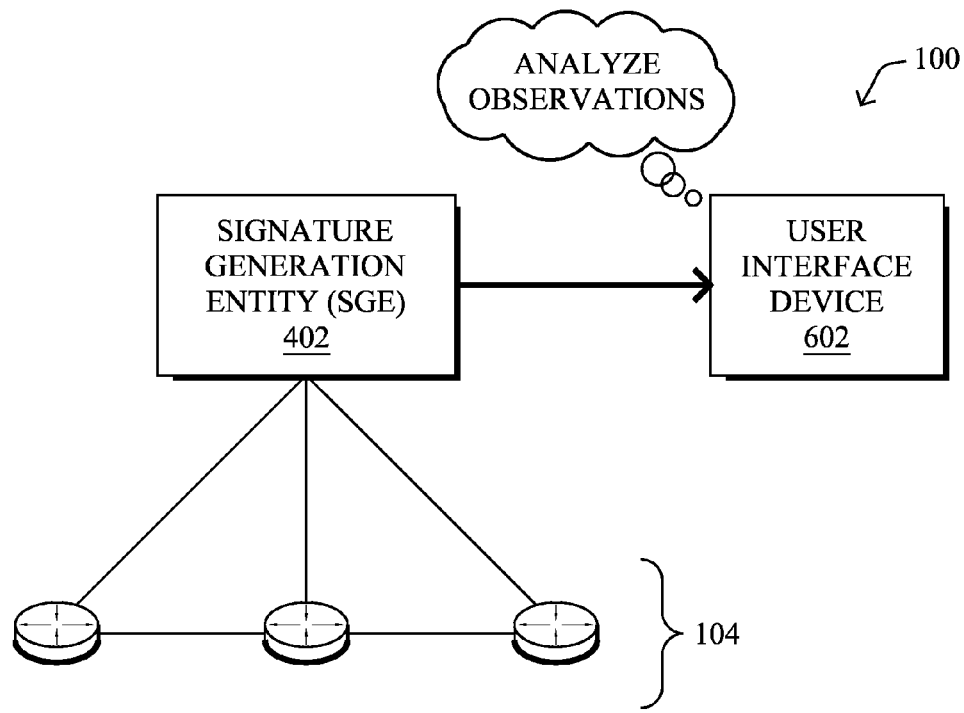
Figure 6C:
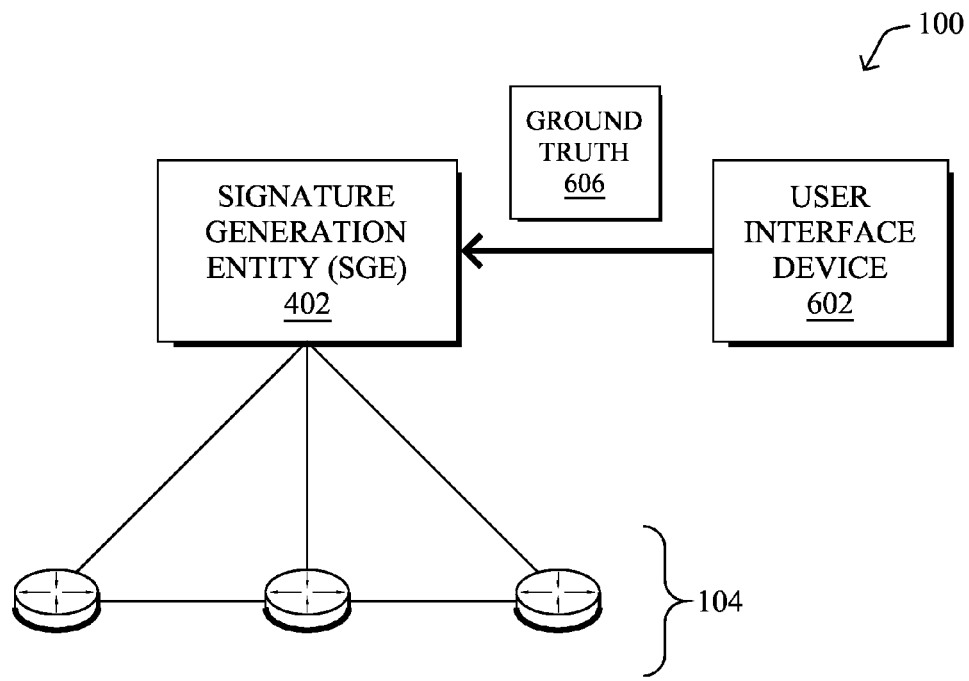

Any number of measures may be taken by the SGE in response to receiving an unexpected behavior notification, according to various embodiments. In one embodiment, a supervised model is used. In particular, in response to receiving unexpected behavior notification 502, SGE 402 may raise an alarm by sending a custom alert message 604 to a user interface device 602, as shown in FIG. 6A. In particular, message 604 may request the intervention of a human expert and may include the observed traffic samples that were unexpected. User interface device 602 may display the traffic samples to the user, as well as any other supporting information, so that the human expert can manually assign a label to the observed behavior, as shown in FIG. 6B. In some cases, the expert can require higher granularity data from the observing classifier (e.g., by requesting Netflow records or packet traces for review).

The expert operating user interface device 602 may label the observed behavior as corresponding to a new attack type or, alternatively, as a previously unseen form of a known attack (e.g., the behavior may be a variation of an attack type that is already supported by the attack detection classifier). In either case, a ground truth 606 (e.g., the label applied by the human expert) may be returned to SGE 402 from user interface device 602.

When a new attack type is identified by ground truth 606, SGE 402 may create a new attack class and add the observed traffic samples exhibiting the unexpected behavior to the training data set for the attack classifier, with a correct label identifying the new attack. SGE 402 may then update the attack detector using the updated training data set and the new classification. For example, the entire ANN classifier or a portion thereof may be recomputed using the updated training data. Subsequently, SGE 402 may then send an updated version of the attack detector that can now recognize the new attack to any or all of the nodes/devices 104. In addition, SGE 402 may generate and send an updated expected traffic model that incorporates the previously unexpected behavior into the training data set.

In other cases, the human expert may determine that the unexpected behavior corresponds to a new version of an already known type of attack. In such a case, ground truth 606 may include the label for the attack type. Notably, such a label already exists since the attack type is already known by the attack detector. In some embodiments, SGE 402 or another device may evaluate the performance of the attack detector on these samples labeled by the expert. If the performance of the classifier is tolerable (e.g., satisfies a recall or precision value set by a user), this means that the classifier is already capable of correctly identifying the behavior as indicative of an attack. However, the expected traffic model may still need to be updated. In this case, SGE 402 may recompute the expected traffic model taking into account the new samples and send the new version of the model to the nodes/devices 104. Otherwise, if the current version of the attack detector is unable to satisfy the required performance, SGE 402 may also update the attack detector by adding the traffic samples to the training data set for the relevant class and recomputing the attack detector. The updated attack detector may then be distributed to the corresponding nodes/devices 104.

A simple use case of may operate as follows. First, an input features vector X enters the detection chain whose anomaly score exceeds the configured threshold. As a result, the evaluation of the vector by the attack detection classifier is stopped. In addition, the input vector may be included in an unexpected behavior notification sent to the SGE. In turn, the SGE may raise a warning for a human expert, who manually inspects the data and determines that they represent a new attack. This information is then fed back to the SGE, which recomputes both the expected traffic model and an updated classifier. The updated traffic model and attack detection classifier may then be provided to any or all of the attack detection nodes/devices.

Figure 7A:
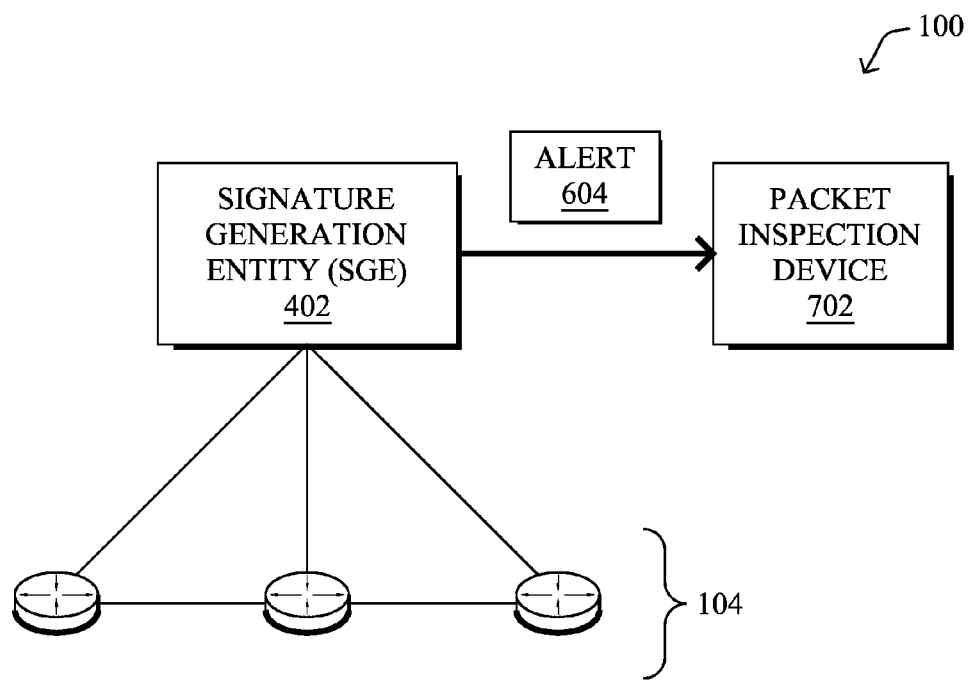
FIGS. 7A-7B illustrate an example of an attack detector being updated via a packet inspection device.
Figure 7B:
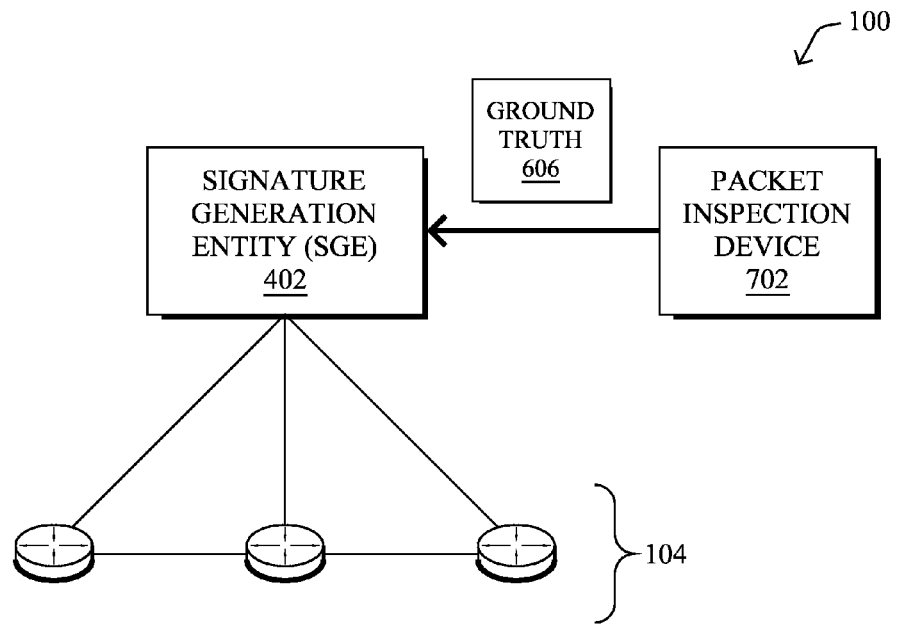

In another embodiment, instead of using a human expert to establish a ground truth, the suspicious traffic may be redirected to a deep packet inspection (DPI) device or other scrubbing device for identification. For example, as shown in FIGS. 7A-7B, SGE 402 may alternatively send alert 604 to a packet inspection device 702, which generates and returns a ground truth 606 to SGE 402. Typically, such an inspection device is close to the demilitarized zone (DMZ) in a large network, without the need to have such a device on every path of every single traffic flow.

Figure 8:
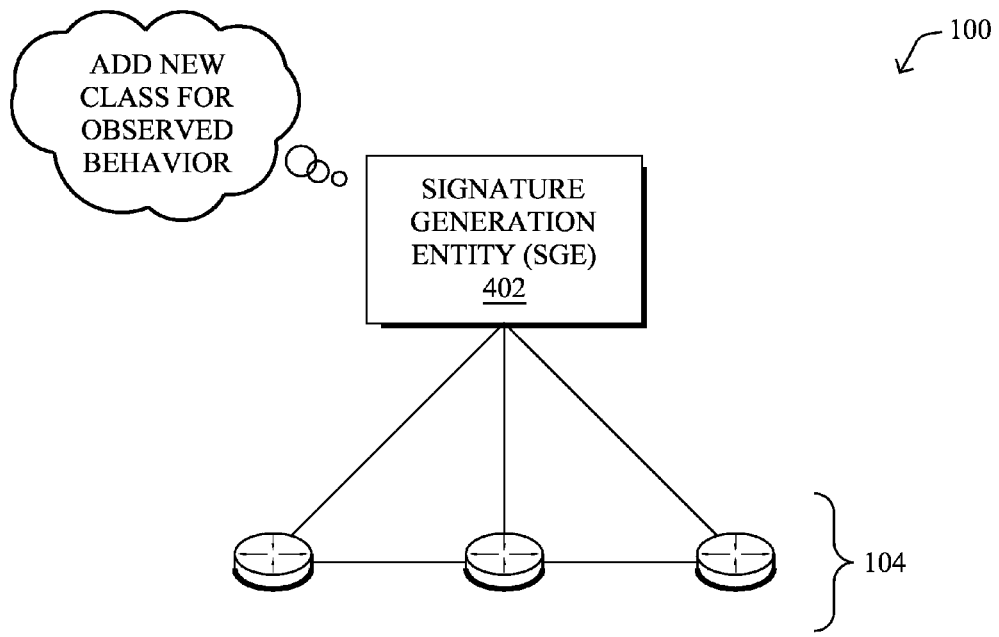
FIG. 8 illustrates an example of an attack detector being updated automatically to account for an unexpected traffic behavior.

In yet another embodiment, the unexpected behavior may be handled by SGE 402 in a completely unsupervised manner. In particular, such a solution may be used when intervention of a human expert or another device may involve an excessive delay or may simply be impossible. In this case, since a detailed ground truth cannot be established, SGE 402 may always create a new class for the observed behavior, as shown in FIG. 8. Of course, the particular attack type cannot be identified in this case and the system can only distinguish between malicious or legitimate behavior. In particular, in order to distinguish whether the current unknown traffic is malicious or legitimate, SGE 402 may retrieve the current performance indices of the network resources that the security infrastructure is in charge of protecting. For example, SGE 402 may retrieve the CPU utilization for web servers, bandwidth utilization for network links, application response times for certain critical applications, etc. This can be done, for example, by using the SNMP protocol or by examining Netflow records, which is often available on the network controller, where SGE 402 is likely to be located.

If the performance indices retrieved by SGE 402 show that the unknown traffic is not causing any performance degradation, SGE 402 may assume that no attack is in progress and will assume "normal traffic" as the ground truth for the unrecognized samples. Otherwise a new attack class may be created which will constitute the ground truth for such samples. In each case, once the data have been labelled, the mechanism will proceed similar to the supervised case.

Notably, if a new attack class is created automatically by SGE 402, this allows detecting the new attack, but may not be enough to take any specific mitigation actions. Regardless, SGE 402 may save any unrecognized traffic samples used to automatically generate a new attack class (e.g., independently or using a packet inspector) and raise an alarm for a human expert to analyze it at a later time. The expert may then ensure that the system made the right decision and, possibly, provide an actual identifier for the newly created attack class.

Figure 9:
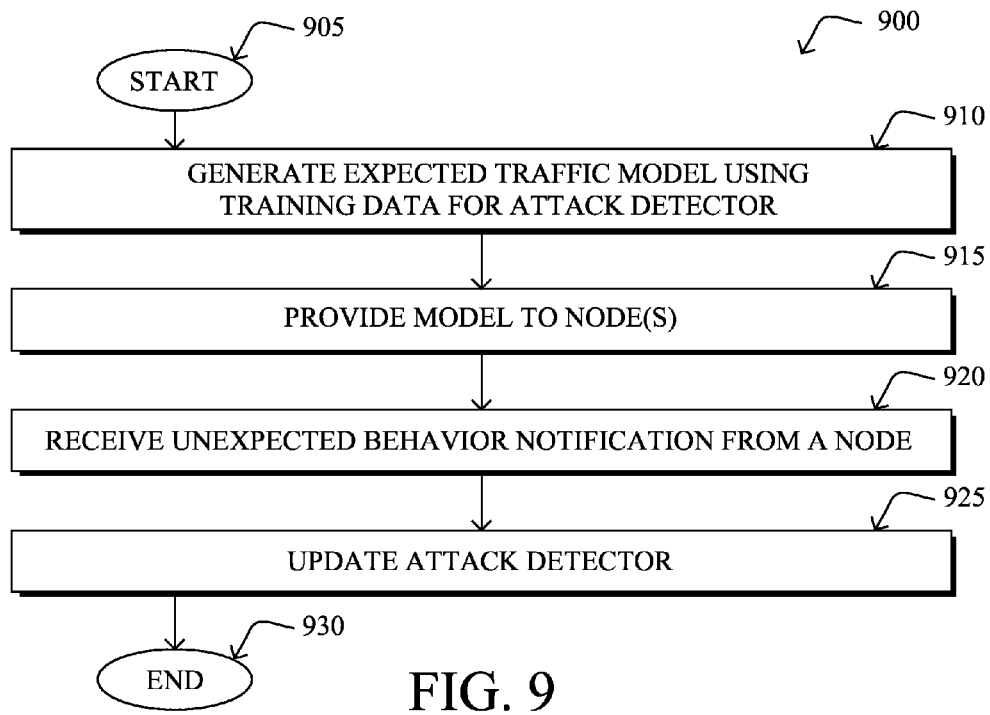
FIG. 9 illustrates an example simplified procedure for using an expected traffic model to update an attack detector.

FIG. 9 illustrates an example simplified procedure for using an expected traffic model to update an attack detector in accordance with one or more embodiments described herein. The procedure 900 may start at step 905, and continues to step 910, where, as described in greater detail above, a network device generates an expected traffic model using training data for an attack detector. For example, an attack detector process that uses machine learning (e.g., an ANN classifier, etc.) may be trained using a set of training data (e.g., traffic and/or network characteristics). Notably, the set of training data may include both data that indicates an attack and data that indicates normal operation of the network. Such training data may also be used to generate a model that represents the expected traffic behavior of the network. For example, an expected traffic model may be a GMM, cluster-based model, or other predictive model that is formed using the training data for the attack detector.

At step 915, the expected traffic model is provided to one or more network nodes, as detailed above. In particular, the expected traffic model may be sent to any network node that executes an attack detector, such as the attack detector trained using the training set of data on which the expected traffic model is based. In some cases, the expected traffic model may be sent in conjunction with an anomaly threshold value that may be used by the node(s) to compare their respective traffic observations with the expected traffic model. In one embodiment, a node receiving the expected traffic model may first check to see whether or not the model is compatible with its attack detector. If the model is incompatible, the node may return a rejection notification.

At step 920, an unexpected behavior notification is received from a node, as described in greater detail above. After installation of the expected traffic model at the node, the node may use the model to filter its input data for its attack detector. In particular, the node may compare its traffic observations to the expected traffic model, prior to analyzing the traffic observations with the attack detector process. Since the expected traffic model represents the set of behaviors used to train the attack detector, the comparison effectively tests whether or not the newly observed behavior falls within the scope of training. If it does not (e.g., an anomaly score for the difference between the observations and the model exceed a predefined threshold), the node may generate and send an unexpected behavior notification back to the network device that installed the traffic model on the node. In various embodiments, the notification may also indicate or include data regarding the observed behavior that was deemed unexpected by the node.

At step 925, the attack detector is updated to account for the observed traffic behavior that was deemed unexpected by the node, as detailed above. In one embodiment, the traffic behavior may be sent to a user interface device for manual assessment by a human expert. In some cases, the expert may deem the observations as indicative of a new attack type and provide a new label to be used by the attack detector. In other cases, the expert may deem the observations as a variation of an already known attack (e.g., the attack detector is already configured to detect the type of attack). Accordingly, the new observations may be associated with the corresponding label which is already in use by the attack detector, since the attack type is already known. In another embodiment, the traffic observations may be sent to a deep packet inspector/scrubbing center for analysis. The attack detector may then be updated based on the results of this analysis. In yet another embodiment, the network device that received the unexpected behavior notification may itself add the observed behavior to the attack detector as a new classification. In some cases, this may be done based on whether or not the performance of the network associated with the observed behavior was impacted (e.g., the observed behavior may be labeled as an attack by the updated attack detector, if a corresponding drop in network performance occurred). Procedure 900 then ends at step 930.

Figure 10:
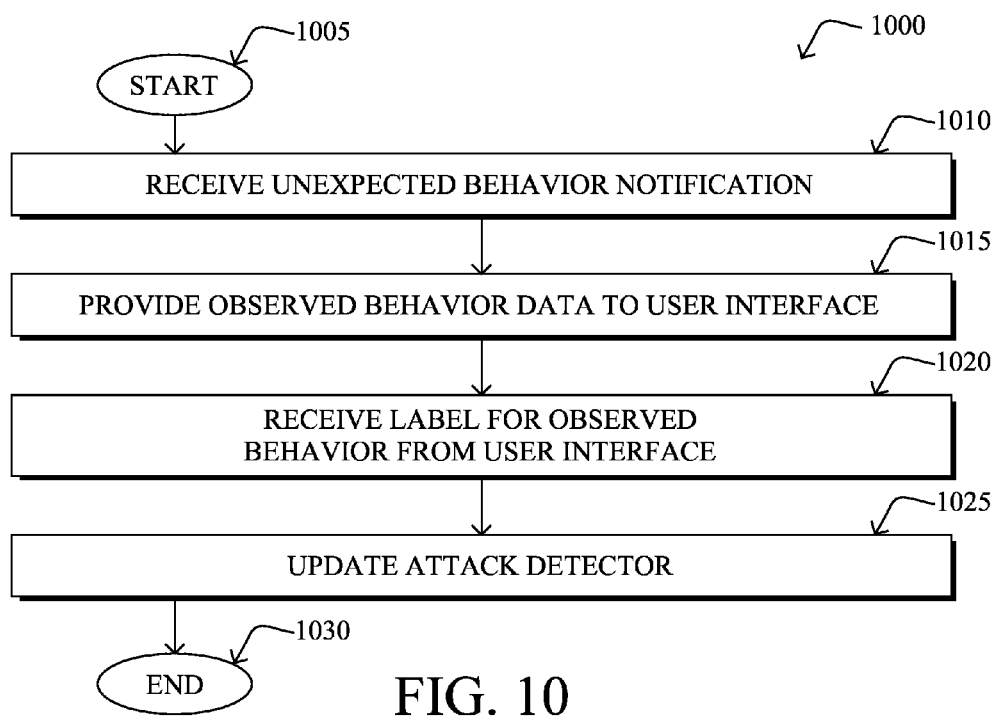
FIG. 10 illustrates an example simplified procedure for updating an attack detector via a user interface device.

FIG. 10 illustrates an example simplified procedure for updating an attack detector via a user interface device in accordance with one or more embodiments described herein. The procedure 1000 may start at step 1005, and continues to step 1010, where, as described in greater detail above, an unexpected behavior notification is received by a network device. Such a notification may indicate or include data regarding an observed behavior that a node deemed unexpected using an expected traffic model installed at the node.

At step 1015, the network device provides the observed traffic behavior data to a user interface device, as detailed above. For example, the traffic behavior data may be provided to a display screen or other interface device configured to convey and/or receive data with a human user. In some cases, the user operating the interface device may also be able to retrieve additional data regarding the observed behavior, such as Netflow records, etc.

At step 1020, a label is received for the observed behavior from the user interface, as described in greater detail above. In some cases, the label may be a previously unused label by an attack detector. For example, the label may signify a new attack type, based on the user's review of the unexpected traffic behavior. In other cases, the label may be a label that is already in use by the attack detector, thereby signifying that the unexpected behavior is a previously unseen form of a known attack type or, alternatively, is not indicative of an attack at all (e.g., the behavior may be labeled as "normal").

At step 1025, the attack detector is updated using the received label, as highlighted above. In particular, the observed behavior data may be added to the training data for the model and associated with the received label, to update the attack detector. Thus, when the behavior is seen again, the attack detector may label the behavior accordingly. Procedure 1000 then ends at step 1030.

Figure 11:
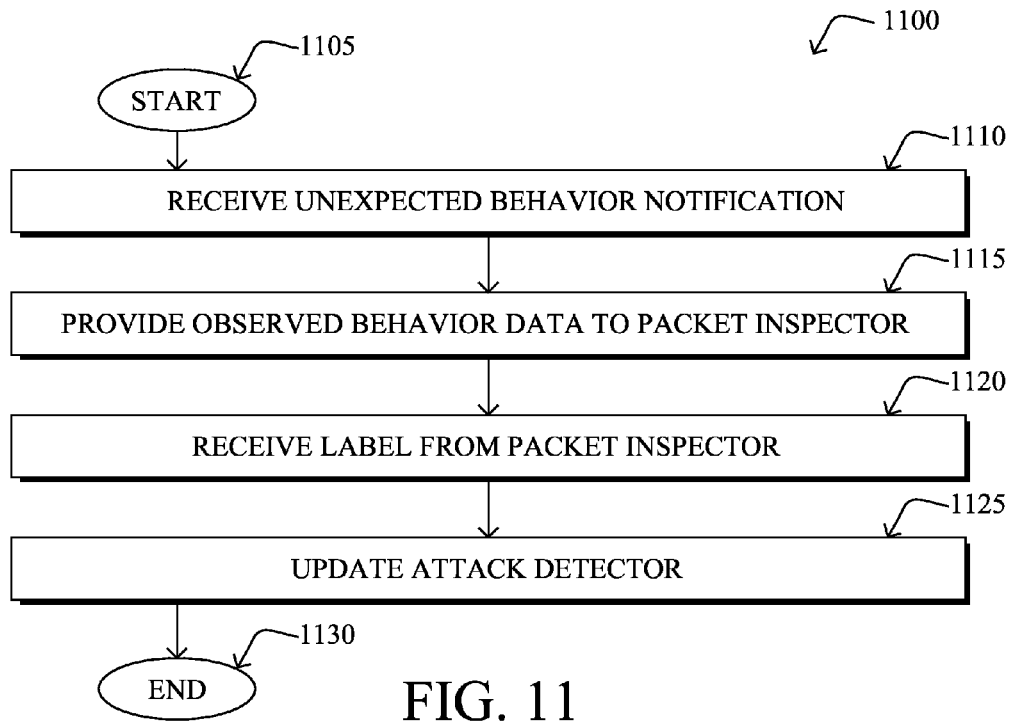
FIG. 11 illustrates an example simplified procedure for updating an attack detector via a deep packet inspector.

FIG. 11 illustrates an example simplified procedure for updating an attack detector via a deep packet inspector in accordance with one or more embodiments described herein. The procedure 1100 may start at step 1105, and continues to step 1110, where, as described in greater detail above, an unexpected behavior notification is received.

At step 1115, the observed behavior data from the unexpected behavior notification is provided to a deep packet inspector, as detailed above. In general, a deep packet inspector may be configured to examine the header and/or payload of packets, to provide a form of traffic filtering in the network. For example, such a system may be configured to detect viruses, certain attacks, attempted security breaches, and the like. Similar to the human expert discussed above, the deep packet inspector may further be operable to associate a label with the observed behavior data.

At step 1120, the label generated by the deep packet inspector is received, as described in greater detail above. For example, the label may indicate that the observed behavior corresponds to normal network behavior, a known attack type (e.g., an attack type that may already be detected by a deployed attack detector), or even a new attack type.

At step 1125, an attack detector is updated using the received label, as discussed above. As noted previously, updating an attack detector may generally entail adding the observed behavior to the training set of data used to train the attack detector and retraining the attack detector to apply the received label to this type of behavior. Procedure 1100 then ends as step 1130.

Figure 12:
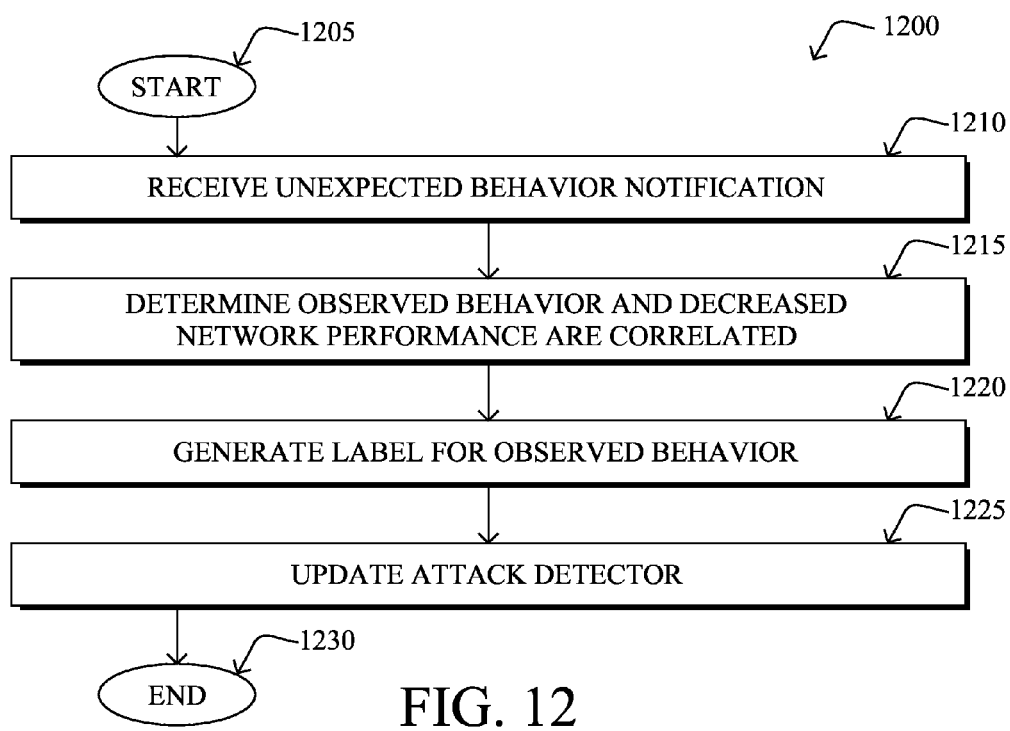
FIG. 12 illustrates an example simplified procedure for automatically adding a new label to an attack detector.

FIG. 12 illustrates an example simplified procedure for automatically adding a new label to an attack detector in accordance with one or more embodiments described herein. The procedure 1200 may start at step 1205, and continues to step 1210, where, as described in greater detail above, an unexpected behavior notification is received regarding a previously unseen network behavior observed by one of the nodes in the network.

At step 1215, as detailed above, the device that received the notification may determine whether or not the observed behavior and a decreased network performance are correlated. For example, in some cases, the device may retrieve network performance indices from the security infrastructure of the network (e.g., using Netflow records, SNMP protocol, etc.), to determine whether the observed behavior has potentially impacted network performance.

At step 1220, a label is generated for the observed behavior based on the determination in step 1215, as described in greater detail above. For example, if the network performance associated with the observed behavior is determined to be within normal levels, the observed behavior may be labeled as normal. However, if the network performance decreased, the observed behavior may be labeled as suspicious or requiring additional review (e.g., by a human expert) at a later time.

As step 1225, the attack detector is updated to incorporate the observed behavior and the label from step 1220, as described in greater detail above. Notably, the attack detector may be updated to apply the corresponding label to any further observations of the behavior. Procedure 1200 then ends at step 1230.

Figure 13:
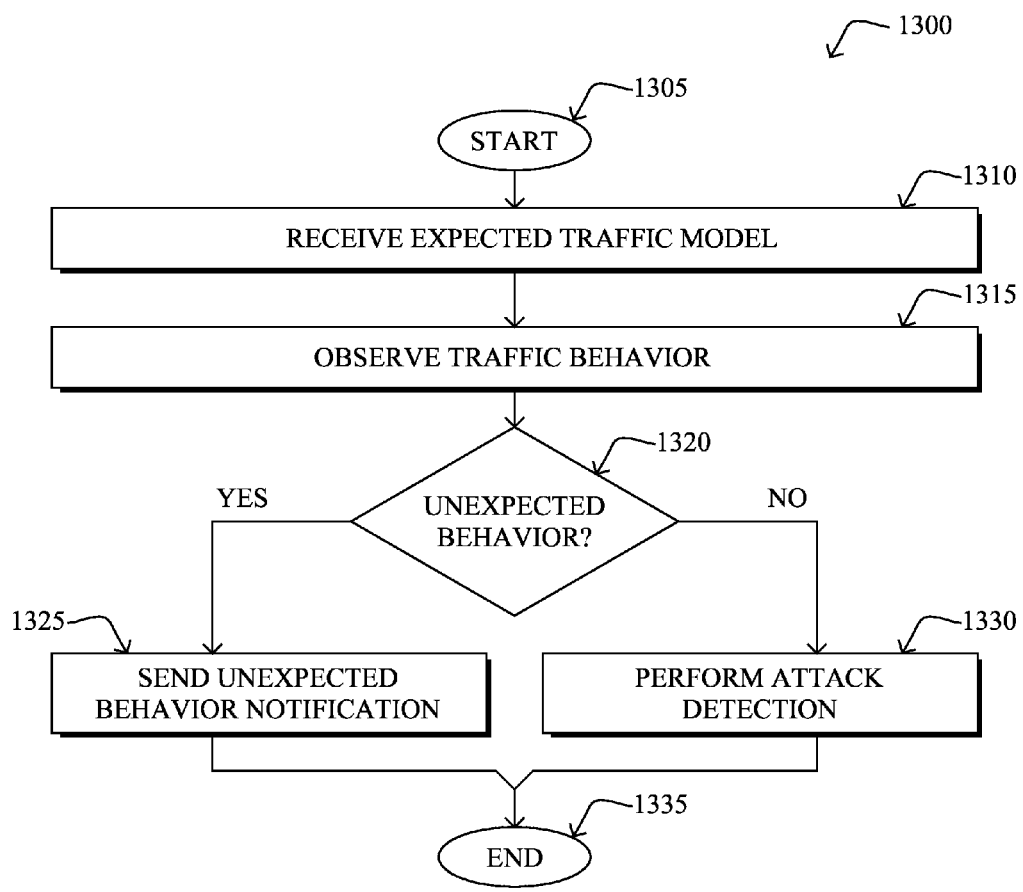
FIG. 13 illustrates an example simplified procedure for evaluating observed traffic behavior.

FIG. 13 illustrates an example simplified procedure for evaluating observed traffic behavior in accordance with one or more embodiments described herein. In general, procedure 1300 may be performed by any node in a network to which an attack detector is deployed. For example, an attack detection ANN classifier may be deployed to a particular network node. The procedure 1300 may start at step 1305, and continues to step 1310, where, as described in greater detail above, an expected traffic model is received by the node. Such a traffic model may, as detailed above, be based on the training set of data used to train the node's attack detector. For example, the training set of data may be modeled using a GMM, cluster-based model, or other such model that may be used to model the traffic behaviors used to train the attack detector.

At step 1315, traffic behavior is observed by the node, as detailed above. For example, the node may observe the number of requests, the bandwidth usage, the amount of delays, the amount of jitter, etc. of the traffic. In some cases, the behavior may be observed directly by the node (e.g., the traffic is flowing through the node itself). In other cases, the node may observe the traffic indirectly (e.g., by receiving traffic records from one or more other nodes in the network).

At step 1320, the node determines whether the observed traffic behavior is unexpected, as described in greater detail above. In particular, the node may compare the observed traffic behavior to the expected traffic model, to determine whether or not the difference between the two exceeds an anomaly threshold. Said differently, the node may determine whether or not the observed traffic behavior deviates from the behaviors used to train its attack detector. If the behavior is unexpected, procedure 1300 continues on to step 1325. Otherwise, procedure 1300 continues on to step 1330.

At step 1325, the node sends an unexpected behavior notification to another device, as detailed above. In cases in which the observed traffic behavior deviates from the behaviors used to train the node's attack detector, the node may report this situation to a supervisory device such as the device that originally provided the attack detector to the node. In various embodiments, the notification may indicate or include data regarding the observed behavior, thereby allowing the device to initiate corrective measures (e.g., updating the attack detector to account for the unexpected behavior). In some cases, the node may also hold off on attempting to classify the unexpected behavior with its attack detector. Procedure 1300 then ends at step 1335.

At step 1330, the node performs attack detection using the observed traffic behavior, as detailed above. In cases in which the observed traffic behavior is expected (e.g., the behavior falls within that modeled by the expected traffic model), the node may proceed to classify the observed behavior with its attack detector. For example, even if the observed behavior is expected (e.g., known to the attack detector), it may still indicate that a particular type of DoS attack is present. The node may then initiate corrective measures, such as generating an alert, etc. Procedure 1300 then ends at step 1335.

It should be noted that while certain steps within procedures 900-1300 may be optional as described above, the steps shown in FIGS. 9-13 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 900-1300 are described separately, certain steps from each procedure may be incorporated into each other procedure, and the procedures are not meant to be mutually exclusive.

The techniques described herein, therefore, improve the reliability of a machine learning-based attack detector by filtering out input vectors that would imply an undetermined output. In particular, the techniques herein may allow a node to identify an observed traffic behavior that was not used to train its corresponding attack detector. Further, the techniques herein allow signatures for previously unknown attacks to be created on the fly. In particular, the signature may be expressed in terms of a statistical characterization of the aggregated traffic and the signature creation mechanism may be triggered by comparing the observed traffic with a statistical model of the behaviors the classifier is able to recognize, which may make also make the mechanism applicable to encrypted traffic.

While there have been shown and described illustrative embodiments that provide for the detection of a network attack, it is to be understood that various other adaptations and modifications may be made within the spirit and scope of the embodiments herein. For example, while the techniques herein are described primarily with respect to attack-detection classifiers, the techniques herein may also be adapted for use with classifiers that apply labels that are not related to attack detection. In addition, while certain networks and topologies are described herein, the techniques may be applied more generally to any form of computer network.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising: generating, by a device in a network, an expected traffic model, wherein a training set of data used to train a machine learning attack detector is also used to generate the expected traffic model, and the expected traffic model represents an overall set of behaviors for which the machine learning attack detector has already been trained; transmitting, by the device, the expected traffic model to one or more nodes in the network, the expected traffic model used by the one or more nodes to identify an observed traffic behavior that was not present in the training set of data used to train machine learning attack detector, wherein the expected traffic model triggers the machine learning attack detector to analyze the observed traffic behavior when the observed traffic behavior is expected, and wherein the expected traffic model triggers the one or more nodes to prevent the machine learning attack detector from analyzing the observed traffic behavior when the observed traffic behavior is unexpected; receiving, at the device, an unexpected behavior notification from a particular node of the one or more nodes, wherein the particular node generates the unexpected behavior notification based on a comparison between the expected traffic model and an observed traffic behavior at the particular node that results in the observed traffic behavior being unexpected by the expected traffic model; and updating, by the device, the machine learning attack detector to account for the observed traffic behavior.

2. The method as in claim 1, further comprising: training, by the device, the machine learning attack detector using the training set of data; and deploying, by the device, the machine learning attack detector to the one or more nodes.

3. The method as in claim 1, further comprising: providing, by the device, the observed traffic behavior to a user interface device; and receiving, at the device, a label for the observed traffic behavior from the user interface device, wherein the machine learning attack detector is updated using the received label.

4. The method as in claim 3, wherein the label indicates that the observed traffic behavior corresponds to a new attack type or corresponds to a new form of a known attack type.

5. The method as in claim 1, further comprising: updating, by the device, the expected traffic model using the observed traffic behavior.

6. The method as in claim 1, further comprising: providing, by the device, the observed traffic to a deep packet inspector; and receiving, at the device, a label for the observed traffic behavior from the deep packet inspector, wherein the machine learning attack detector is updated using the received label.

7. The method as in claim 1, further comprising: correlating, by the device, a decrease in network performance with the observed traffic behavior; generating, by the device, a new label for the observed traffic behavior; and updating, by the device, the machine learning attack detector using the new label.

8. The method as in claim 1, further comprising: deploying, by the device, the updated machine learning attack detector to the one or more nodes.

9. The method as in claim 1, further comprising: receiving, at the device and from a network node, a rejection notification for the expected traffic model, wherein the rejection notification is generated based on the expected traffic model being incompatible with an attack detector executed by the network node.

10. The method as in claim 1, wherein the expected traffic model comprises a statistical model of the training set of data.

11. A method, comprising: receiving, at a node in a network, an expected traffic model, wherein the expected traffic model represents an overall set of behaviors for which a machine learning attack detector has already been trained and a training set of data used to train the machine learning attack detector executed by the node is used to generated the expected traffic model, the expected traffic model used by the node to identify an observed traffic behavior that was not present in the training set of data used to train the machine learning attack detector, wherein the expected traffic model triggers the machine learning attack detector to analyze the observed traffic behavior when the observed traffic behavior is expected, and wherein the expected traffic model triggers the node to prevent the machine learning attack detector from analyzing the observed traffic behavior when the observed traffic behavior is unexpected; observing, by the node, a traffic behavior of traffic through the network; determining, by the node, that the observed traffic behavior is an unexpected traffic behavior by comparing the observed traffic behavior to the expected traffic model; upon determining that the observed traffic behavior is unexpected, preventing, by the node, the machine learning attack detector from analyzing the unexpected traffic behavior; and sending, by the node, an unexpected behavior notification that identifies the unexpected traffic behavior.

12. The method as in claim 11, wherein the expected traffic model is received via a message that identifies the machine learning attack detector, includes parameters of the expected traffic model, and includes an anomaly score threshold to be used by the apparatus when determining whether the observed traffic behavior is an unexpected traffic behavior.

13. The method as in claim 11, wherein the expected traffic model comprises a statistical model of the training set of data.

14. An apparatus, comprising: one or more network interfaces to communicate with a network; a processor coupled to the one or more network interfaces and configured to execute one or more processes; and a memory configured to store a process executable by the processor, the process when executed operable to: generate an expected traffic model, wherein a training set of data used to train a machine learning attack detector is also used to generate the expected traffic model, and the expected traffic model represents an overall set of behaviors for which the machine learning attack detector has already been trained, wherein the expected traffic model triggers the machine learning attack detector to analyze an observed traffic behavior when the observed traffic behavior is expected, and wherein the expected traffic model triggers the apparatus to prevent the machine learning attack detector from analyzing the observed traffic behavior when the observed traffic behavior is unexpected; transmit the expected traffic model to one or more nodes in the network, the expected traffic model used by the one or more nodes to identify the observed traffic behavior that was not present in the training set of data used to train the machine learning attack detector; receive an unexpected behavior notification from a particular node of the one or more nodes, wherein the particular node generates the unexpected behavior notification based on a comparison between the expected traffic model and an observed traffic behavior by the particular node that results in the observed traffic behavior being unexpected by the expected model; and update the machine learning attack detector to account for the observed traffic behavior.

15. The apparatus as in claim 14, wherein the process when executed is further operable to: train the machine learning attack detector using the training set of data; and deploy the machine learning attack detector to the one or more nodes, wherein the one or more nodes are configured to prevent the machine learning attack detector from analyzing a traffic behavior that is deemed unexpected based on the expected traffic model.

16. The apparatus as in claim 14, wherein the process when executed is further operable to: provide the observed traffic behavior to a user interface device; and receive a label for the observed traffic behavior from the user interface device, wherein the machine learning attack detector is updated using the received label.

17. The apparatus as in claim 16, wherein the label indicates that the observed traffic behavior corresponds to a new attack type or to a new form of a known attack type.

18. The apparatus as in claim 14, wherein the process when executed is further operable to: update the expected traffic model using the observed traffic behavior.

19. The apparatus as in claim 14, wherein the process when executed is further operable to: provide the observed traffic to a deep packet inspector; and receive a label for the observed traffic behavior from the deep packet inspector, wherein the machine learning attack detector is updated using the received label.

20. The apparatus as in claim 14, wherein the process when executed is further operable to: correlate a decrease in network performance with the observed traffic behavior; generate a new label for the observed traffic behavior; and update the machine learning attack detector using the new label.

21. The apparatus as in claim 14, wherein the process when executed is further operable to: deploy the updated machine learning attack detector to the one or more nodes.

22. The apparatus as in claim 14, wherein the process when executed is further operable to: receive, from a network node, a rejection notification for the expected traffic model, wherein the rejection notification is generated based on the expected traffic model being incompatible with an attack detector executed by the apparatus.

23. The apparatus as in claim 14, wherein the expected traffic model comprises a statistical model of the training set of data.

24. An apparatus, comprising: one or more network interfaces to communicate with a network; a processor coupled to the one or more network interfaces and configured to execute one or more processes; and a memory configured to store a process executable by the processor, the process when executed operable to: receive an expected traffic model, wherein the expected traffic model represents an overall set of behaviors for which a machine learning attack detector has already been trained and a training set of data used to train the machine learning attack detector executed by the apparatus is used to generated the expected traffic model, the expected traffic model used by the apparatus to identify an observed traffic behavior that was not present in the training set of data used to train the machine learning attack detector, wherein the expected traffic model triggers the machine learning attack detector to analyze the observed traffic behavior when the observed traffic behavior is expected, and wherein the expected traffic model triggers the apparatus to prevent the machine learning attack detector from analyzing the observed traffic behavior when the observed traffic behavior is unexpected; observe a traffic behavior of traffic through the network; determine that the observed traffic behavior is an unexpected traffic behavior by comparing the observed traffic behavior to the expected traffic model; upon determining that the observed traffic behavior is unexpected, prevent the machine learning attack detector from analyzing the unexpected traffic behavior; and send an unexpected behavior notification that identifies the unexpected traffic behavior.

25. The apparatus as in claim 24, wherein the expected traffic model is received via a message that identifies a particular attack detector, includes parameters of the expected traffic model, and includes an anomaly score threshold to be used by the apparatus when determining whether the observed traffic behavior is an unexpected traffic behavior.

26. The apparatus as in claim 24, wherein the expected traffic model comprises a statistical model of the training set of data.

* * * * *